United States Patent [19]

Campagnolo

[11] 4,290,180

[45] Sep. 22, 1981

[54] FIXTURE FOR SPECIAL GEARS, PARTICULARLY OF BICYCLES

[76] Inventor: Tullio Campagnolo, Corso Padova 168, Vicenza, Italy

[21] Appl. No.: 128,478

[22] Filed: Mar. 10, 1980

[51] Int. Cl.$^3$ .............................................. B23P 19/04

[52] U.S. Cl. ........................................ 29/240; 29/283; 81/68; 269/47

[58] Field of Search ................ 29/240, 283; 81/68-69; 269/47

[56] References Cited

U.S. PATENT DOCUMENTS

| | | | |
|---|---|---|---|
| 1,150,663 | 8/1915 | Cosseboon | 81/68 |
| 2,242,080 | 5/1941 | Kurzina | 29/240 |
| 4,157,608 | 6/1979 | Campagnolo | 29/240 |

FOREIGN PATENT DOCUMENTS

| | | | |
|---|---|---|---|
| 648483 | 8/1928 | France | 81/68 |
| 427850 | 12/1947 | Italy | 81/68 |

*Primary Examiner*—Robert C. Watson
*Attorney, Agent, or Firm*—Young & Thompson

[57] ABSTRACT

A fixture for mounting sprocket wheels on and removing them from the free-wheel units of bicycles, comprising a first tool in the form of an elongated metal plate, having a handgrip and a functional part provided with a plurality of recesses shaped to receive and mate with elements of a free-wheel unit, and cooperating with at least two locking pin members, and a second tool comprising a handle, provided at one end with a half-moon shaped body having a length of bicycle transmission chain pivotally connected to one end thereof. The recesses in said first tool are apt to mate with the outer profile as well as with the wall of an inner hole of the free-wheel unit elements having to be applied to said tool. The second tool comprises, in order to engage the sprocket wheels of said free-wheel unit, on one hand said transmission chain length and, on the other hand, a pair of chain links mounted so as to form an articulated parallelogram.

3 Claims, 6 Drawing Figures

FIXTURE FOR SPECIAL GEARS, PARTICULARLY OF BICYCLES

BACKGROUND OF THE INVENTION

The present invention relates to improvements in the fixture for mounting and removing special gears, particularly in an apparatus for mounting sprocket wheels on and removing them from the free-wheel units of bicycles, described in the U.S. Pat. No. 4,157,608 of the same Applicant.

Said patent relates to an apparatus of the aforementioned type, comprising a first tool in the form of an appropriately shaped elongated metal plate, having a smooth handgrip and a functional part provided with a plurality of recesses which are shaped to receive and mate with elements of a free-wheel unit so as to prevent their rotation, each of said recesses being provided at the centre with a screw-threaded hole, said first tool comprising at least two locking pin members apt to be screwed into said screw-threaded holes and to lock in said recesses of the plate the elements of the free-wheel unit having to be handled, and a second tool in the form of a handle provided at one end with a half-moon shaped body having a length of bicycle transmission chain pivotally connected to one end thereof, said half-moon shaped body having a groove extending along the entire length of its inner circumferential edge for housing the toothed periphery of a sprocket wheel engaged by said second tool.

On using the apparatus according to said patent it has been found that the two tools forming the same could be appropriately improved to obtain a more rational, efficient and prompt use of said apparatus, and the present invention relates to such improvements the importance of which will appear particularly evident to experts when using the apparatus during cycling races.

SUMMARY OF THE INVENTION

The apparatus according to the invention is characterized in that the recesses of the first tool forming said apparatus, which are shaped to receive the elements of the free-wheel unit, are apt to mate not only with the outer profile of such elements, but also with the inner wall of the hole of said elements. For this purpose, the tool recesses comprise a central cylindrical projection, of appropriate diameter, to "pilot" the element in its own recess at the moment of its insertion.

The apparatus according to the invention is moreover characterized in that the second tool forming said apparatus comprises—in addition to the transmission chain length designed to surround the sprocket wheel having to be handled and to engage the teeth thereof—a pair of oscillating chain links forming an articulated parallelogram.

BRIEF DESCRIPTION OF THE DRAWINGS

The invention will now be described in further detail with reference to a preferred embodiment thereof illustrated in the accompanying drawings, in which:

FIG. 3 is a front view of the second tool of the apparatus according to the invention, of which

DESCRIPTION OF THE PREFERRED EMBODIMENT

Figure 1:
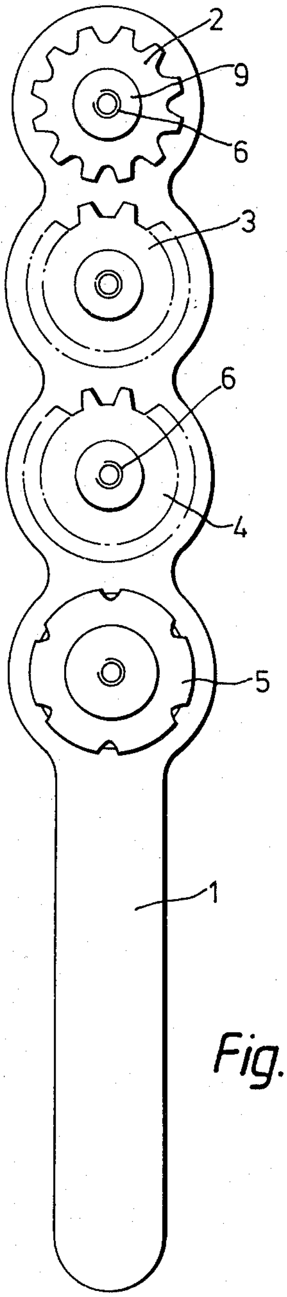
FIG. 1 is a front view of the first tool of the apparatus according to the invention.
Figure 2:
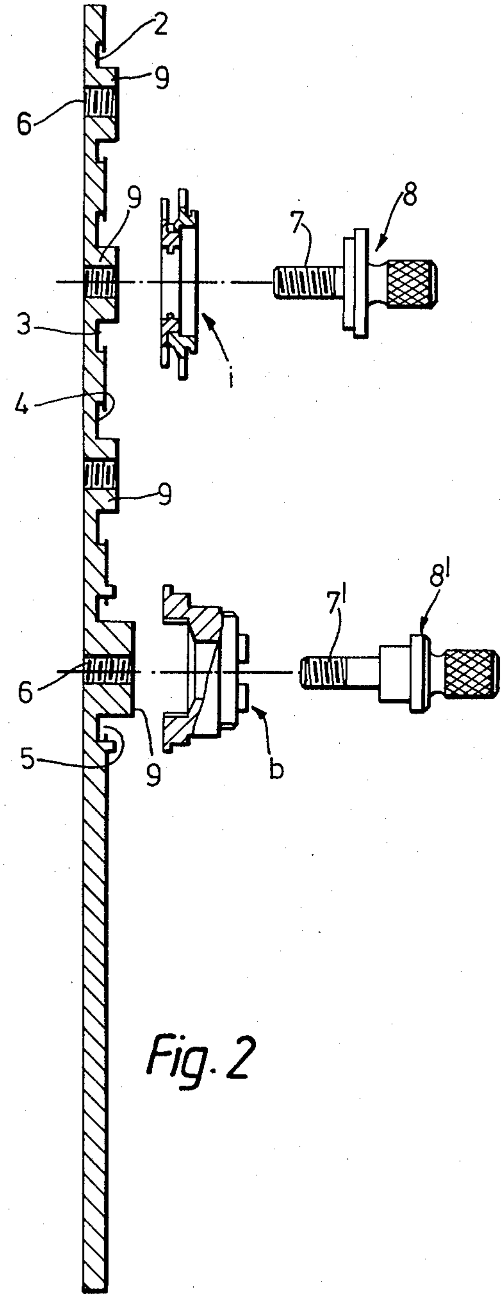
FIG. 2 is a longitudinal section view of the same tool of FIG. 1 and of two free-wheel elements to be mounted or removed with the same tool.
Figure 3:
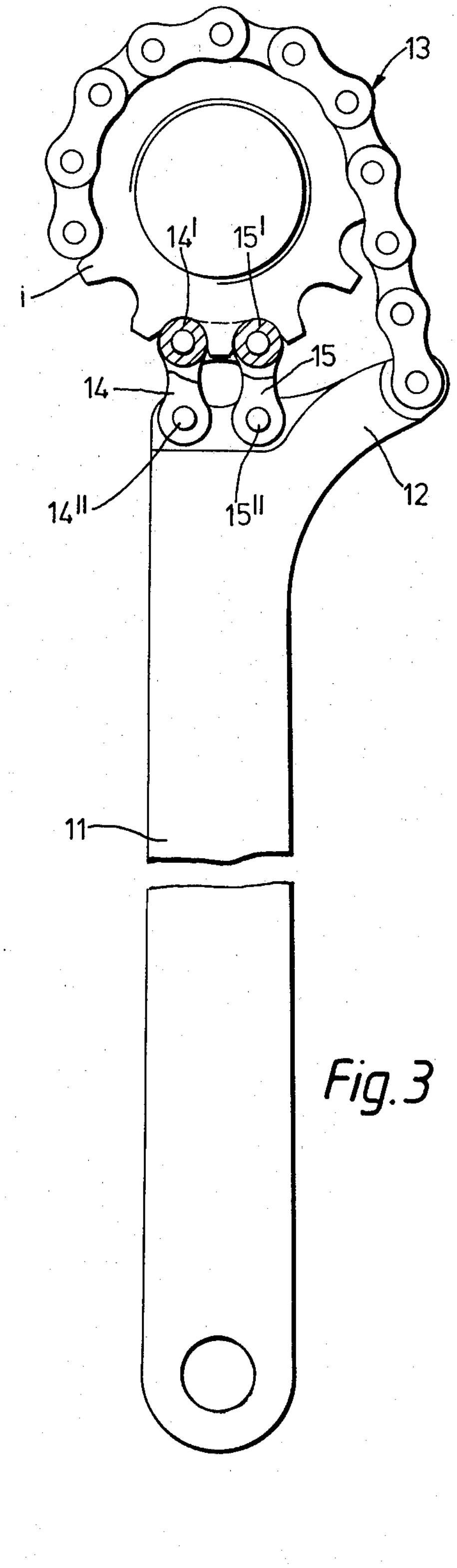
Figure 4:
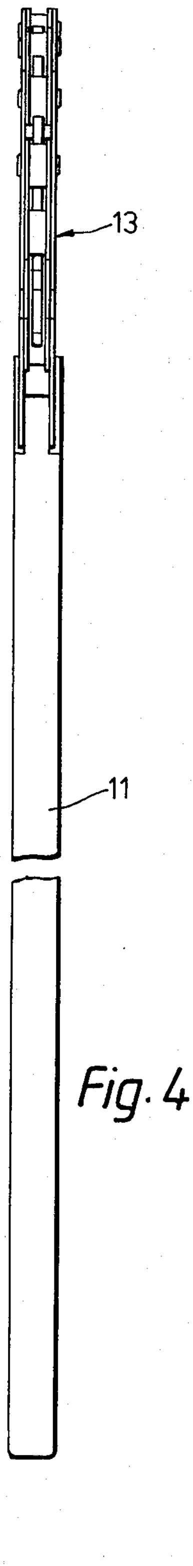
FIG. 4 is a side view.

With reference to FIGS. 1 and 2 of the drawings, it can be seen that the shaped metal plate 1—forming the first tool of the apparatus according to the invention—comprises four aligned recesses 2, 3, 4, 5, which reproduce the shape of the outer profile of three differently sized sprocket wheels i of the free wheel unit and, respectively, the shape of the outer profile of the base b of the free-wheel outer body.

The aforespecified recesses are provided at the centre with screw-threaded holes 6 for housing equally threaded pins 7, 7', of locking members 8, 8', which lock the free-wheel elements having to be handled. Such holes 6 are obtained, in the tool according to the present invention, at the centre of a cylindrical projecting part 9 designed to promptly mate with the inner wall of the central hole of the three sprocket wheels of the free-wheel unit and, respectively, of the free-wheel outer body having to be mounted or removed.

In this manner, the free-wheel elements may very easily and promptly be inserted into each of the correspondingly shaped recesses 2, 3, 4, 5, thanks to the fact that they are "piloted" in such recesses by the projections 9. The use of the tool thereby results to be far more practical, handy and swift, than in the case of the tool described in the heretoforespecified U.S. Pat. No. 4,157,608.

Figure 5:
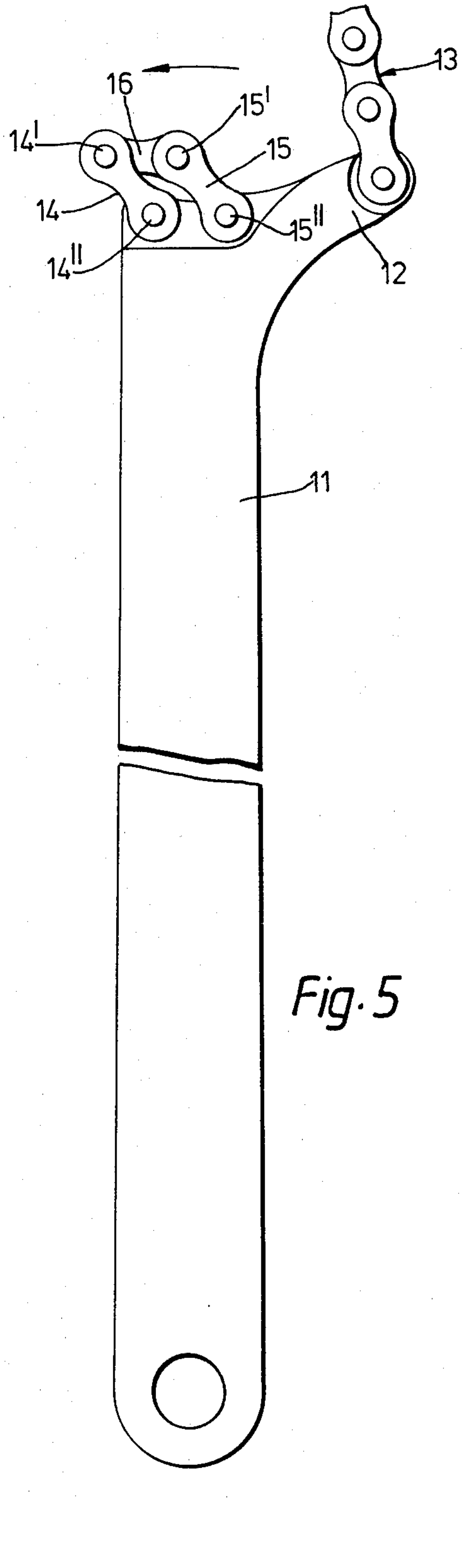
FIGS. 5 and 6 show two different positions of the pair of links forming a parallelogram in the tool of FIGS. 3 and 4.
Figure 6:
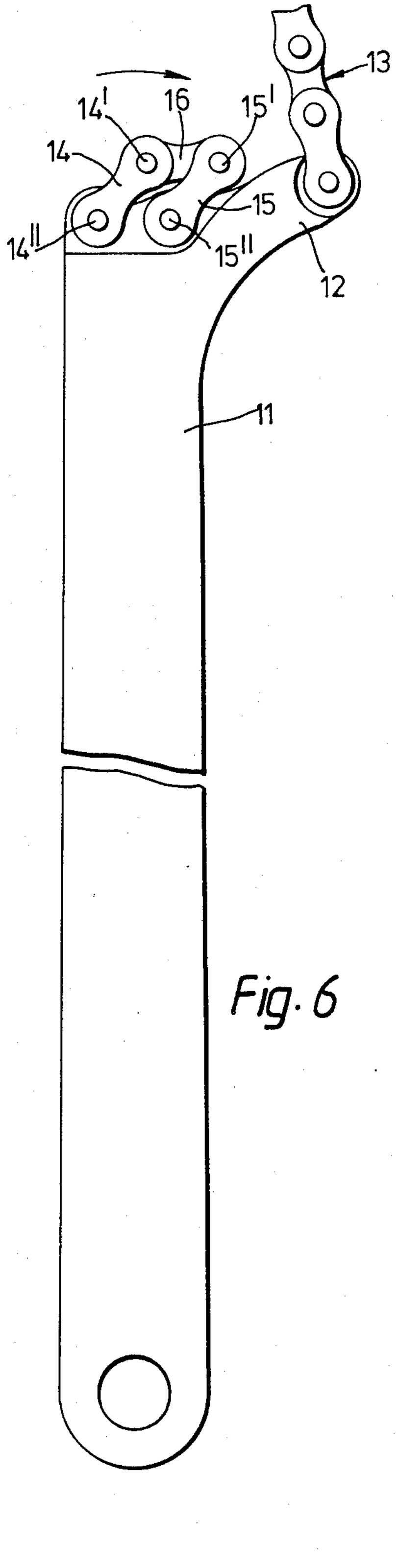

Referring now to FIGS. 3 to 6 of the drawings, it can be seen that the second tool of the apparatus according to the invention comprises, in known manner, a handle 11 provided at one end with an arm 12, to the end of which is pivotally connected the first link of a length 13 of bicycle transmission chain. At the same end, close to where the arm 12 starts, the tool carries moreover pivotally connected thereto, one next to the other, two chain links 14, 15, similar to the links of the chain length 13. These two links are constantly kept parallel to each other by a third link 16 connected to their rollers 14', 15', at the end far from the rollers 14", 15", which are connected to the end of the handle 11; this arrangement allows to form a true and proper articulated parallelogram, apt to oscillate from left to right—as shown in FIGS. 5 and 6—and to take up, between these two end positions, an infinite number of other positions, as for example the one shown in FIG. 3. The distance between the two parallel links 14, 15, is such as to allow their outward rollers 14', 15', to mesh exactly with the cavities between the adjacent teeth of the sprocket wheel i having its toothing corresponding to the chain links provided on the tool, as clearly shown in FIG. 3.

The apparatus according to the invention is used in a substantially similar way to that of the heretoforespecified U.S. Patent, but with greater ease and safety: to mount or remove the set of two sprocket wheels i (FIG. 2) being screwed onto the smaller diameter end of the outer body b (FIG. 2) of a free-wheel unit, it is sufficient to place the free-wheel outer body with its bottom flange into the recess 5, with its grooves mating with the reliefs of said recess, and to fix said body to the tool 1 by screwing into the corresponding hole 6 the pin 7' of the locking member 8'. The insertion of the body b into the recess 5 is speeded up by the presence of the projecting part 9. At this point it will be sufficient to engage the chain length 13, provided on the second tool of FIGS. 3 to 6, with the teeth of the sprocket wheel i and to insert on the periphery of this latter the parallelogram links 14, 15, with the rollers 14', 15', meshing with the cavities between two adjacent pairs of sprocket wheel teeth.

One then grips with one hand the handle 1 of the first tool and with the other hand the handle 11 of the second tool, to operate a reciprocal rotary movement apt to tighten, in one sense, and to loosen in the other sense, the screwing of the sprocket wheel onto the free-wheel body. In this operation, the precise engagement between the tools and the sprocket wheels, and the correct reciprocal position of the rotating parts are guaranteed, thereby reducing the effort and preventing ill-distributed stresses, while there are no risks whatsoever either that the parts may escape the perfect control of the operator, or that they may get damaged. In particular, the use of chain lengths and of chain links, as 13 and 14, 15, for engaging the sprocket wheels and for the specific mounting thereof, guarantees a perfect control on such sprocket wheels.

Likewise, and with the same advantages, one solves the problem of unscrewing or screwing one to the other the sprocket wheels i, one of which gets locked into the corresponding recess of the plate 1.

It should be noted that, during use of the apparatus, both the chain length 13 and the links 14, 15, 16, bear onto the bottom of the sprocket wheel teeth engaged thereby, so that the peripheral part of said sprocket wheels, being the most delicate, will not get stressed and damaged.

Of course, the aforespecified embodiment of the apparatus according to the present invention may be modified without thereby departing from the scope of the invention itself.

I claim:

1. An apparatus for mounting and removing special gears, particularly for mounting sprocket wheels on and removing them from the free-wheel units of bicycles, comprising a first tool in the form of an appropriately shaped elongated metal plate, having a smooth handgrip and a functional part provided with a plurality of recesses which are shaped to receive and mate with elements of a free-wheel unit so as to prevent their rotation, each of said recesses being provided at the centre with a screw-threaded hole, said first tool comprising at least two locking pin members apt to be screwed into said screw-threaded holes and to lock in said recesses of the plate the elements of the free-wheel unit having to be handled; and a second tool of the type comprising a handle, provided at one end with a half-moon shaped body having a length of bicycle transmission chain pivotally connected to one end thereof, characterized in that, the recesses in said first tool are apt to mate not only with the outer profile of the free-wheel unit elements having to be applied to the tool, but also with the wall of the inner hole of said elements, and in that, said second tool comprises, in order to engage the sprocket wheels of said free-wheel unit, on one hand a transmission chain length and, on the other hand, a pair of chain links mounted so as to form an articulated parallelogram.

2. An apparatus as in claim 1, wherein the recesses in said first tool comprise a central projecting part, having a diameter corresponding to that of the hole of the element to be fixed thereon, so as to pilot said element into its recess.

3. An apparatus as in claim 1, wherein the links of said pair of links provided on said second tool are pivoted with one end to the tool itself and have their opposite ends linked in an articulated manner to a third link, the first two links being parallel and mutually spaced so as to guarantee the perfect insertion of their outer rollers into two adjacent cavities between the teeth of the sprocket wheel having to be engaged.

* * * * *